C. J. MANNING.
RECORDING LOW PRESSURE GAGE.
APPLICATION FILED SEPT. 15, 1911.
1,044,678.
Patented Nov. 19, 1912.
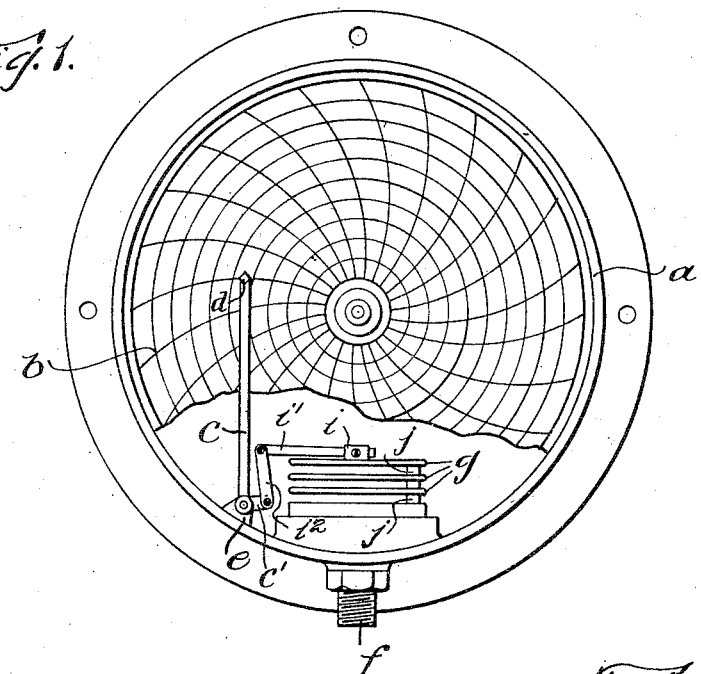
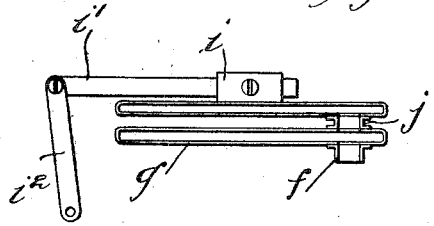
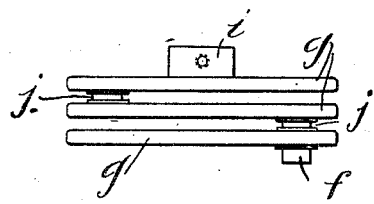
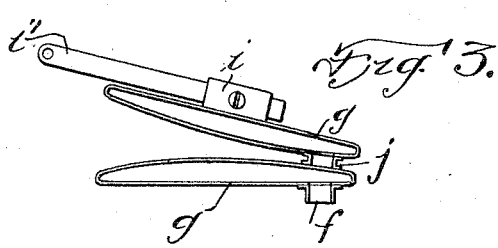
Witnesses:
Harry L. Allen
F. R. Penlston
Inventor:
C. J. Manning
by Wright, Brown, Quinby & May

UNITED STATES PATENT OFFICE.

COLEMAN J. MANNING, OF MEDFORD, MASSACHUSETTS, ASSIGNOR TO AMERICAN STEAM GAUGE & VALVE MANUFACTURING COMPANY, OF BOSTON, MASSACHUSETTS, A CORPORATION OF NEW JERSEY.

RECORDING LOW-PRESSURE GAGE.

1,044,678.     Specification of Letters Patent.     Patented Nov. 19, 1912.

Application filed September 15, 1911. Serial No. 649,546.

*To all whom it may concern:*

Be it known that I, COLEMAN J. MANNING, a citizen of the United States, and a resident of Medford, in the county of Middlesex and State of Massachusetts, have invented certain new and useful Improvements in Recording Low-Pressure Gages, of which the following is a specification.

This invention relates to devices for indicating or recording variations of pressure, and has particular reference to that class of such devices in which the air or gas the pressure of which is to be indicated or recorded, is admitted to a plurality of connected disk-shaped expansible chambers, one of which operates a device for making a record on a revolving dial.

The object of the present invention is to provide a simple and sensitive instrument of the character mentioned, in which the necessary amount of movement will be imparted to the marker by a minimum number of the connected chambers, the instrument being especially adapted, owing to its delicacy or sensitiveness, to record the variations of pressure in deep mines so as to give information of the presence of gas mixed with the air, since such mixture increases the pressure. When used for this purpose, the instrument itself may be set up above ground and have a small tube connected to the nipple or inlet of the gage, which tube has its lower open end down in the mine.

To these ends the invention consists in the improvements which I will now proceed to describe and claim.

Of the accompanying drawings which form a part of this specification,—Figure 1 is a front elevation, a portion of the dial being broken out, of a gage embodying my invention; Fig. 2 is a detail sectional view, on a larger scale, and showing a different number of the connected chambers; Fig. 3 is a view similar to Fig. 2, but showing the result of increased internal pressure; Fig. 4 is a detail view illustrating another arrangement of the connections between the expansible chambers.

Similar reference characters indicate the same or similar parts in all the figures.

Referring first to Fig. 1, the gage casing $a$ is shown as containing a dial $b$ of a well-known type, which dial, as is usual, is rotated by clock mechanism. An oscillatory lever $c$ carries a marker $d$, such as a pen, for making a record on the dial of fluctuation of pressure, said arm being pivoted to the frame or casing at $e$. The inlet nipple for the connection of the pipe (not shown) leading to the mine or elsewhere, is shown at $f$.

The expansible chambers $g$, of which there may be two, as shown in Figs. 2 and 3, or more, as shown in the other figures, are each constructed of two thin sheets of metal, preferably of disk form but not necessarily so, said two sheets being connected at their margins to form a chamber adapted to be expanded or bulged at its sides by internal pressure. The lower chamber is connected to the inlet $f$ and the upper chamber is preferably connected with the marker by the following means: Rigidly secured to the top of the upper chamber, as by lugs and a clamp screw $i$, is an arm $i'$ which extends beyond the margin of the chamber and is connected by a link $i^2$ with an arm $c'$ of the marker lever $c$. I do not limit myself to this particular form of connections for operating the marker by movements of the upper chamber.

Each chamber $g$ is connected with the next one by a short tube $j$, located near one margin or edge of the chambers. This causes the connection between the chambers to be eccentric so that, under the influence of internal pressure, the chambers will diverge, as shown by comparing Figs. 2 and 3. And since the arm $i'$ extends beyond the margin of the upper chamber in a direction away from a line leading from the center of the chamber to the connection $j$, the amount of motion caused by the diverging of the chambers is amplified so as to be easily utilized, through the connections described, to give all the motion that is required for the marker $d$, even when only two expansible chambers are shown, as in Figs. 2 and 3, thus reducing the number of chambers to the minimum.

It is to be noted especially that the marginal connections between the chambers are not direct; that is, the walls of the chambers do not touch or connect directly, but only through the medium of the tubes $j$. Therefore, when internal pressure causes the sides of the chambers to bulge, the upper side of the lower chamber causes the tube $j$ to tilt or swing outward (see Fig. 3) and the bulging of the under side of the next higher chamber causes the median plane of that chamber to assume a greater degree of inclination than could result if the adjacent walls of the chambers were connected directly together. The tube connections j enable me to obtain with two chambers substantially as great a range of movement of the portion of the upper chamber which carries the lug i, as can be obtained from four chambers having their sides directly united, without tubes. Whether two chambers g are employed, or more, the tipping of the chamber or chambers succeeding the lower one, results in a considerable amplitude of movement being imparted to the marker by a very small increase of pressure.

If more than two chambers are used, a structure such as shown in Fig. 4 may be employed, the tube connections alternating instead of one being above another. Then the movements of the lug i will be in a substantially straight line instead of the curved path shown by comparing Figs. 2 and 3.

I claim:—

1. A pressure gage having a pressure actuated member consisting of chambers arranged side by side, the opposing sides of each chamber being expansible relatively to each other, the sides of adjacent chambers having small openings close to their margins connected by a tube.

2. A pressure gage having an inlet, a chamber communicating with said inlet and having a flexible side, a second chamber having a flexible side spaced from the flexible side of the first mentioned chamber, whereby expansion will cause said flexible sides to move apart, and a small pipe having its ends connected to marginal portions of said flexible sides.

3. A pressure gage having a pressure actuated member consisting of a plurality of chambers arranged side by side, the adjacent sides of each chamber being flexible and spaced from each other whereby expansion will cause the said flexible sides to move apart, said flexible sides having small openings close to their margins, and a short pipe having one end connected to the opening of one of the said sides and its other end connected to the opening of the adjacent flexible side.

4. A pressure gage having a pressure actuated member consisting of expansible chambers arranged side by side, a small tube connecting the adjacent walls of said chambers close to their margins whereby internal pressure will cause the margins at the other side of the center from the connection to diverge, an arm rigidly connected to one of said chambers and extending beyond the margin thereof in a direction substantially parallel with the plane of said chambers, a pivoted marker arm and a link operatively connecting said arms.

In testimony whereof I have affixed my signature, in presence of two witnesses.

COLEMAN J. MANNING.

Witnesses:
ELIZABETH L. ROBINSON,
P. W. PEZZETTI.

---

Copies of this patent may be obtained for five cents each, by addressing the "Commissioner of Patents, Washington, D. C."